Aug. 15, 1950 — W. F. MARSHALL — 2,519,146
CONVERTIBLE PARCEL CARRIER

Filed March 31, 1947 — 3 Sheets-Sheet 1

INVENTOR
WILLIAM F. MARSHALL
BY Cook and Ackermesham
ATTORNEYS

Aug. 15, 1950 W. F. MARSHALL 2,519,146
CONVERTIBLE PARCEL CARRIER
Filed March 31, 1947 3 Sheets-Sheet 2

INVENTOR
WILLIAM F. MARSHALL
BY Cook and Schermerhorn
ATTORNEYS

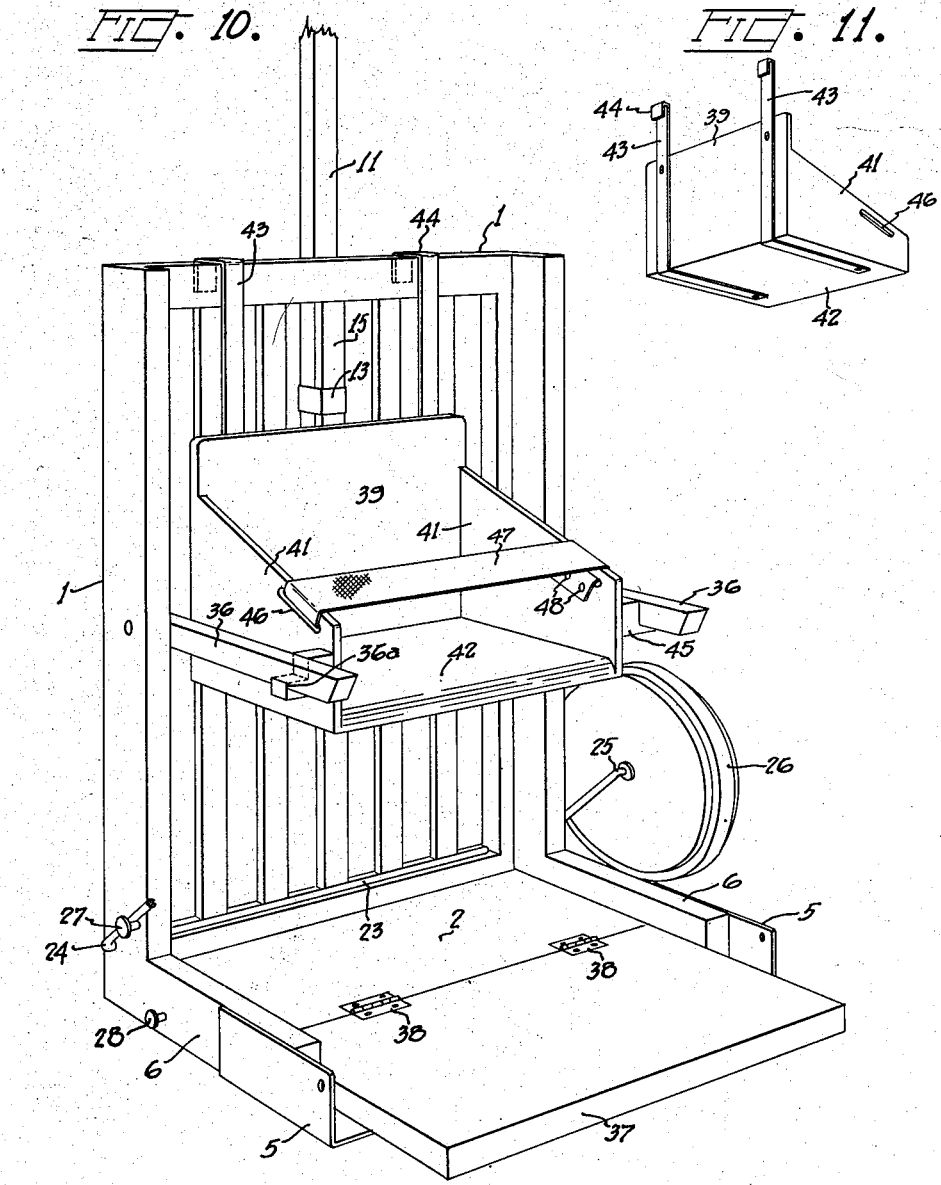

Patented Aug. 15, 1950

2,519,146

UNITED STATES PATENT OFFICE 2,519,146

CONVERTIBLE PARCEL CARRIER

William F. Marshall, Portland, Oreg.

Application March 31, 1947, Serial No. 738,340

8 Claims. (Cl. 280—36)

This invention relates to collapsible carriages, and pertains particularly to a portable cart which may be used as a child's carriage, parcel carrier, or the like.

It is an object of the present invention to provide a portable cart adaptable for convenient hand carrying and readily convertible for transportation on wheels. Another object is to provide in a portable cart a novel axle construction having wheels which may readily be retracted and extended, as desired. A further object is to provide a portable wheeled cart which is adapted to stand upright on the floor with the wheels retracted.

A still further object is to provide a parcel carrier which, when empty, may be collapsed to a compact form for convenience in carrying. It is a related object to provide said parcel carrier with auxiliary carrying means for more convenient use when said carrier is filled with parcels, said auxiliary means serving alternatively to hold the basket of said carrier in a collapsed condition when empty.

An additional object of the invention is to provide a portable cart which may readily be converted for use as a child's carriage, parcel carrier or the like. Other objects of the present invention are to provide a portable cart which is light in weight, and of a construction simple to manufacture and assemble. Still further objects and advantages of the present invention will in part be set forth and in part be apparent in the annexed specification, reference being made to the accompanying drawings, wherein:

Figure 10 is a perspective view of an adaptation of the invention to carriage use showing the hinged foot rest extended and a child's chair seat detachably mounted on the rear frame; and Figure 11 is a perspective view illustrating the construction of the child's chair seat shown in Figure 10.

Figure 6:
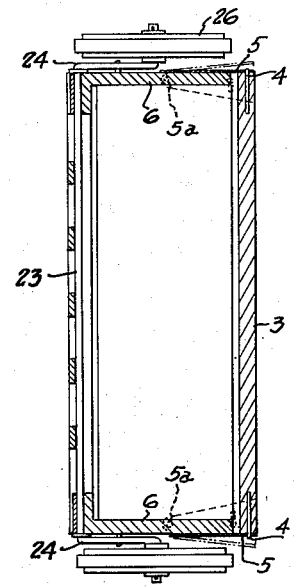
Figure 6 is a sectional view of Figure 1 taken along the line 6—6.
Figure 9:
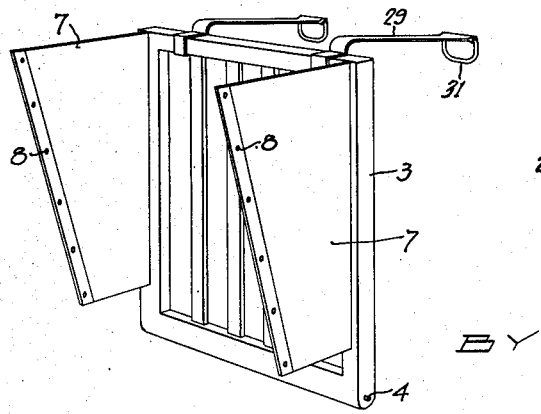
Figure 9 is a perspective view of the detachable front frame and flexible side enclosures.

The various parts of the present device are attached to or mounted upon a rigid back frame 1 to which is securely fastened a bottom plate 2. A front frame 3 is provided at its lower side edges with projecting pins 4 detachably pivoted in holes in a pair of extension angle plates 5 which are in turn pivotally mounted at 5a on side edge runners 6 on the bottom plate 2. By swinging the angle plates 5 outwardly as indicated by broken lines in Figure 6 they may be disengaged from the pivot pins 4 to release the front frame 3, but the pivotal mountings of these plates at 5a are such that they may be tightened sufficiently to hold them securely in engagement with the pivot pins as shown in full lines to support the front frame for pivotal movement. Flexible sides 7 are securely attached to the side edges of the front frame 3 and are provided with eyelets 8 for receiving screws or snap fittings 9 for releasable attachment to the side edges of the back frame 1. Thus, a collapsible enclosure is formed to provide a basket for receiving parcels, etc.

Figure 1:
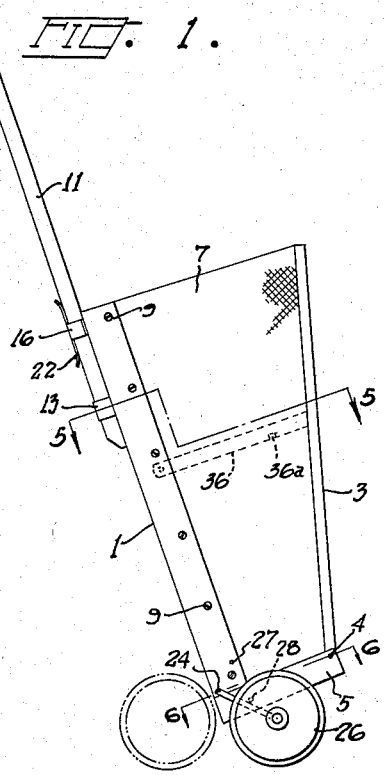
Figure 1 is a side elevation view of a preferred embodiment of the invention showing the parcel carrier in open position, the handle extended and the wheels positioned for rolling.
Figure 5:
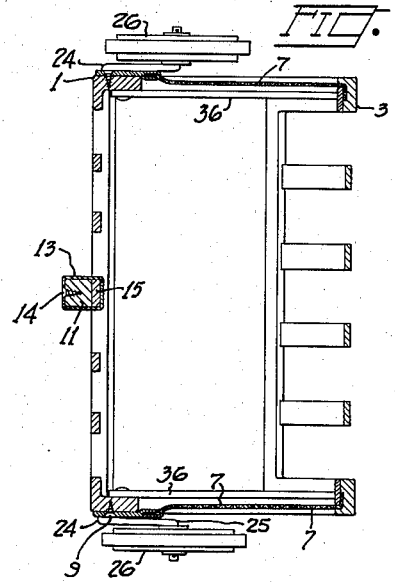
Figure 5 is a sectional view of Figure 1 taken along the line 5—5.

An extensible handle is provided for the convenience of the user and comprises a shaft 11 equipped at its upper end with a handle grip 12 of any desired design as, for example, the loop shown in the drawings, or other form which may be hooked over the arm for convenience in carrying the cart. A metal band 13 fastened to the lower end of shaft 11, as by screw 14, encompasses said shaft and a longitudinal member 15 of back frame 1, thus providing a guide whereby the shaft 11 may be moved along the member 15. The shaft 11 is slidably enclosed by a clamping member 16 secured to the top of the back frame 1. The clamp 16 has a pair of resilient arms 17 provided with perforations or indentations 18 and 19 for cooperation with lugs 21 and 22, respectively, on the shaft 11. Thus, the handle is locked in retracted position by engaging the lug 21 with perforation 18, as shown in Figure 4, and in the extended position by engaging the lug 22 with perforation 19 as shown in Figure 1.

Means for wheeling the cart is provided by the novel axle construction shown in the drawings. Axle 23 extends across the lower end of back frame 1 and has its ends offset at 24 beyond the lateral edges of the back frame and then turned outwardly at 25 to provide axle stubs for wheels 26. This construction accordingly permits rotation of the wheel and axle assembly about the offset point 24 for retracting and extending said wheels. Thus, for example, when it is desired to shift the wheels from the rolling position shown in full lines in Figure 1, the user has merely to lift the cart from the ground and rotate the wheels and axle assembly rearwardly and upwardly until the offset portions of the axle rest against pins 27, as shown in Figures 4 and 10. Conversely, when it is desired to wheel the cart, one need merely to tilt the cart in a rearwardly direction, whereupon the wheels and offset axle assembly fall away from the pins 27 toward the ground to approximately the position shown in broken lines in Figure 1. Then, by raising the cart, the wheels may readily be positioned thereunder for rolling support, the offset portions of the axle coming to rest against pins 28.

Figure 2:
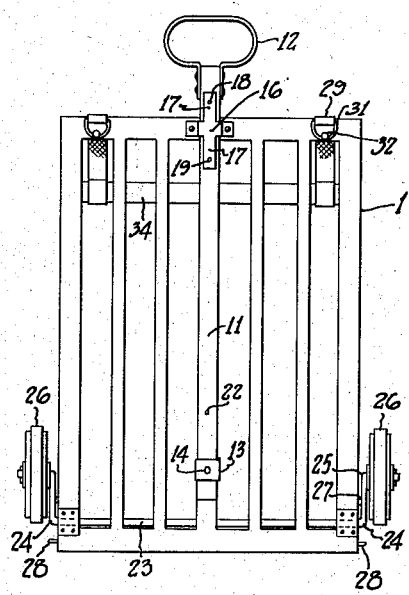
Figure 2 is a rear elevation view of the parcel carrier showing the handle and wheels in retracted position.
Figure 4:
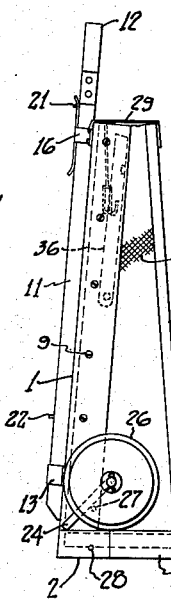
Figure 4 is a side elevation view with the parts disposed as in Figures 2 and 3 and showing the parcel carrier in fully collapsed condition.
Figure 3:
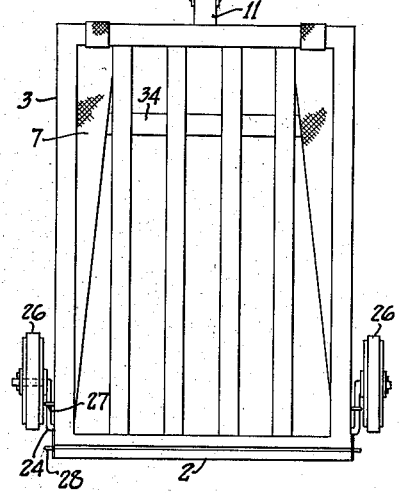
Figure 3 is a front elevation view with the parts disposed as shown in Figure 2.
Figure 8:
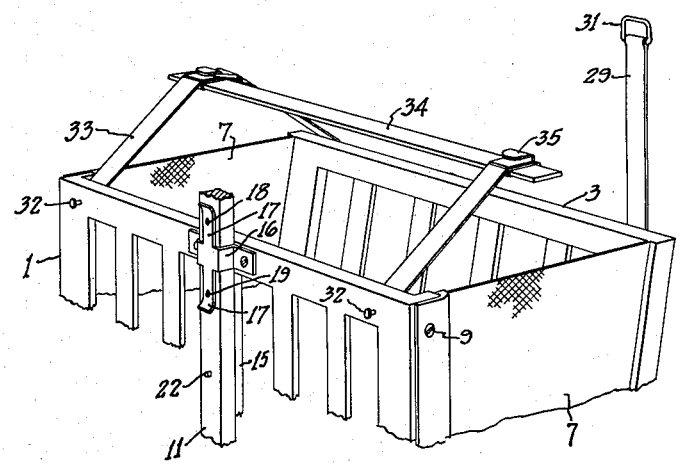
Figure 8 is a fragmentary perspective view of the top of the parcel carrier illustrating the construction of the auxiliary handle.
Figure 7:
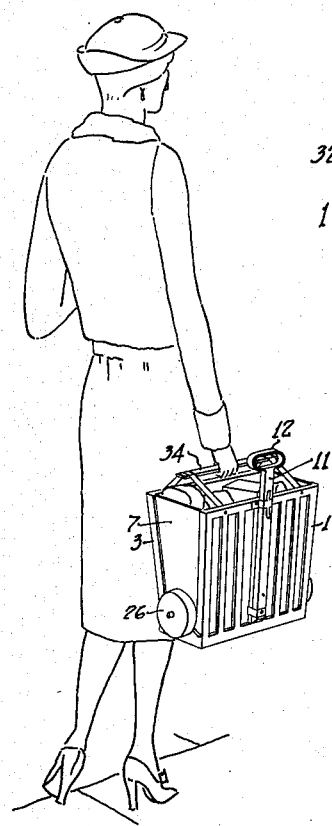
Figure 7 is a perspective view showing the filled parcel carrier being carried by the auxiliary handle.

A pair of straps 29, each securely fastened at one end to front frame 3, are provided at their opposite ends with loops 31 designed to engage pins 32 on the back frame 1 for holding the above described basket in the collapsed condition shown in Figure 4. A pair of straps 33 are each secured at one end to the back frame 1 and at their opposite ends to handle member 34 and hook catches 35. By connecting the loops 31 of straps 29 with catches 35, as shown in Figures 7 and 8, an auxiliary carrying member or handle is provided. More convenient carrying is afforded by this handle when there are parcels in the basket, since the handle is centrally located above the center of gravity of said cart when it is standing upright, as distinguished from the location of the extensible wheeling handle 12 on one side of the cart. Arms 36 are pivotally secured to the back frame 1 to swing forwardly to brace the front frame in its opened position, as shown in Figure 1. When the basket is collapsed the arms 36 are swung upwardly and the handle 34 is dropped into the basket, as indicated by broken lines in Figure 4.

Another adaptation of the present invention is illustrated in Figures 10 and 11 wherein the portable cart is shown converted for use as a child's carriage. The front frame 3 and flexible sides 7 are first removed by releasing the pins at 4 and disengaging the flexible sides removably fastened to the sides of the back frame at 9. A footboard 37 is hingedly connected as at 38 to the bottom plate 2 in such manner as to permit folding of the footboard back upon the bottom plate when not in use. When unfolded, the inner edge of the footboard butts against the outer edge of the bottom plate 2 and is supported thereby. The horizontal inwardly projecting flanges of the angle plates 5 may be utilized to provide additional support for the footboard.

The seat structure to form the carriage adaptation comprises a back 39, side plates 41 and a bottom member 42. Metal straps 43 are secured to the back of said seat and have top free ends bent to form U-shaped hooks 44 to hang on the top edge of back frame 1. As illustrated in Figure 10, the seat is provided with lugs 45 protruding from the sides thereof and adapted for engagement with recesses 36a provided in arms 36 to hold the seat against the back frame and prevent lateral movement. As an alternative or additional means for preventing lateral movement of the seat, the top edge of back frame 1 may be notched to receive hooks 44. Slots 46 in the side plates 41 receive the ends of a safety belt 47, the ends of said belt being provided with snap fittings 48 or other means for detachably securing the belt to the seat.

When the portable cart is to be used as a parcel carrier, the various parts are manipulated and adjusted as follows: For transportation in a vehicle it is desirable to have the cart collapsed to its smallest dimensions. Accordingly, wheels 26 are placed in retracted position by rotating the wheel and axle assembly rearwardly and upwardly until the offset portions of the axle rest against pins 27. Handle member 11 is likewise retracted and is so maintained by locking the lug 21 into perforation 18. Handle 12 may then be used to carry the collapsed cart, or the auxiliary handle 34 may be used. If the former is used, handle 34 is placed within the basket and straps 29 are brought over the top of the basket and loops 31 are connected to pins 32, whereby the basket is held in collapsed position as shown in Figure 4.

Should it be desirable to wheel the cart, lug 21 is released from perforation 18 and the handle drawn upwardly until lug 22 engages perforation 19. The cart is then tilted rearwardly to permit wheels 26 to fall away from pins 27. By raising the cart above the ground, the wheels may readily be placed in rolling position with the offset portions of the axle resting against pins 28 as shown in Figure 1. If, at the market place, the user may wish to place the cart in an upright stationary position for more convenient shopping, the cart is raised from the floor and wheels 26 are retracted as above described, whereby the cart may then be rested upon the base 2. The front frame is then opened outwardly to prepare the basket for receiving the purchases, and bracing arms 36 are swung outwardly to hold the basket open.

When the marketing is completed and the basket is filled, the cart may be wheeled, if desired, or carried in the hand, as illustrated in Figure 7. It is apparent that handle 12, as shown therein, does not provide for convenient hand transportation, since it is not vertically above the center of gravity of the filled basket when the latter is in an upright position. Accordingly, auxiliary handle 34 may be more advantageously employed, and is made available merely by engaging loops 31 and hooks 35 of each cooperating pair of flexible straps 33.

When it is desired to employ the portable cart as a child's carriage, the flexible side members 7 are detached at 9 from the back frame 1, and front frame 3 is removed by detaching the pivot pins 4 from the extension plates 5 on the base plate. The footboard 37 may then be swung upwardly and outwardly on its hinges 38 from the folded position above the base member 2. The portable seat is then secured to the back frame 1 by engaging the hooks 44 of chair straps 43 over the upper horizontal member of the back frame. Arms 36 may then be brought downwardly and the recesses 36a caused to engage the lugs 45 protruding outwardly from the sides of the chair. In this manner the chair is prevented from moving laterally along the back frame. The child may then be placed upon the seat and safety belt 47 secured as shown in Figure 10.

It is apparent from the above described structure and operation that the present invention provides a lightweight, portable cart of simple construction, readily collapsible to small dimension and convertible for diverse uses. Although the above description is drawn specifically to a practical and efficient preferred embodiment of the invention, it is apparent that many modifications may be made therein without departing from the spirit of the invention. It should, therefore, be understood that the invention is to be limited only by the scope of the appended claims.

Having now described my invention and in what manner the same may be used, what I claim as new and desire to protect by Letters Patent is:

1. In a portable cart, a main back frame having at least one longitudinal strut therein, a base member rigidly secured to said back frame, wheels carried by said back frame, an extensible handle comprising a shaft, a band secured to the lower end thereof and surrounding said shaft and longitudinal strut of said back frame, a clamp secured to the upper end of said back frame and slidably enclosing said handle shaft, lugs projecting from said shaft, and means incorporated with said clamp to receive the lugs for holding the handle shaft in a predetermined position.

2. In a portable cart, a main back frame, a base plate rigidly secured thereto, a front frame pivotally secured to said base plate, side members flexibly interconnecting said back and front frames, a handle means comprising a first flexible strap secured to the upper end of said back frame and having a free end provided with a metal loop, a second flexible strap secured to the upper end of said front frame and having a free end provided with a metal hook adapted to receive the metal loop of said first strap, said two straps forming a cooperating pair, at least one more of said cooperating pairs disposed laterally from the first pair, and a hand grip connected near the free end of each second strap of said cooperating pairs.

3. A portable cart comprising a main back frame having at least one longitudinal strut, an axle mounted near the bottom end of said back frame and offset 90° at the lateral edges of said back frame to provide for rotation of said offset portions about the central axle, a base plate rigidly secured perpendicularly to the bottom of said back frame, lugs projecting laterally from the sides of said back frame and base plate for confining the rotational movement of the offset portions of said axle, an extensible handle comprising a shaft and a hand grip secured to the upper end thereof, a band secured to the lower end of the shaft and surrounding said shaft and longitudinal strut of the back frame, a clamp secured to the upper end of the back frame and slidably enclosing said shaft, lugs projecting from said shaft, and means incorporated with said clamp to receive the lugs for holding the handle shaft in a predetermined position, a front frame pivotally secured at its lower end to said base plate, and side members flexibly interconnecting said back and front frames.

4. A portable cart comprising a main back frame having at least one longitudinal strut, an axle mounted near the bottom end of said back frame and offset 90° at the lateral edges of said back frame to provide for rotation of said offset portions about the central axle, a base plate rigidly secured perpendicularly to the bottom of said back frame, lugs projecting laterally from the sides of said back frame and base plate for confining the rotational movement of the offset portions of said axle, an extensible handle comprising a shaft and a hand grip secured to the upper end thereof, a band secured to the lower end of the shaft and surrounding said shaft and longitudinal strut of the back frame, a clamp secured to the upper end of the back frame and slidably enclosing said shaft, lugs projecting from said shaft, means incorporated with said clamp to receive the lugs for holding the handle shaft in a predetermined position, a front frame pivotally secured at its lower end to said base plate, side members flexibly interconnecting said back and front frames, flexible straps secured individually to the upper ends of said back and front frames in cooperating pairs and having free ends, means for detachably joining the free ends of the straps of each cooperating pair, and a handle member connected to straps from the same frame member.

5. A portable cart comprising a main back frame having at least one longitudinal strut, an axle mounted near the bottom end of said back frame and offset 90° at the lateral edges of said back frame to provide for rotation of said offset portions about the central axle, a base plate rigidly secured perpendicularly to the bottom of said back frame, lugs projecting laterally from the sides of said back frame and base plate for confining the rotational movement of the offset portions of said axle, an extensible handle slidably secured to the longitudinal strut of said back frame, a front frame pivotally secured at its lower end to said base plate, side members flexibly interconnecting said back and front frames, one flexible strap secured to the upper end of said back frame and having a free end provided with a metal loop, a second flexible strap secured to the upper end of said front frame and having a free end provided with a metal hook adapted to receive the metal loop of said first strap, said two straps forming a cooperating pair, at least one more of said cooperating pairs disposed laterally from the first pair, a hand grip connected near the free end of each second strap of said cooperating pairs, and means on said front frame for engaging the loops of said first straps to maintain the basket in closed position.

6. A convertible basket cart comprising a back frame, a front frame having a quick detachable pivotal connection mounted from said back frame, a wheel assembly mounted on said back frame to provide rolling support for said cart and retractible to allow said cart to stand upright as a basket, an extensible handle on said back frame adapted for rolling said cart when extended and for carrying said cart when retracted, and a second handle for carrying said cart as a basket and having means for securing said back and front frames collapsed together.

7. A convertible basket cart comprising a back frame, a front frame having a quick detachable pivotal connection mounted from said back frame, a wheel assembly mounted on said back frame to provide rolling support for said cart and retractible to allow said cart to stand upright as a basket, an extensible handle on said back frame adapted for rolling said cart when extended and for carrying said cart when retracted, a second handle for carrying said cart as a basket and having means for securing said back and front frames collapsed together, and flexible side members carried by said front frame and detachably connected to said back frame.

8. A convertible basket cart comprising a back frame, a flat bottom base member on said back frame, a front frame flexibly mounted from said back frame for pivotal movement to open and closed positions, a pair of pivotal arms on said back frame arranged to swing out from said back frame to brace said front frame in open position, and a pair of wheels providing rolling support for the cart and retractible to elevated positions compactly against opposite sides of the cart to allow said cart to stand upright on its base member with said front frame in either open or closed positions.

WILLIAM F. MARSHALL.

REFERENCES CITED

The following references are of record in the file of this patent:

UNITED STATES PATENTS

| Number | Name | Date |
|---|---|---|
| 1,769,418 | Cooper et al. | July 1, 1930 |
| 2,208,347 | Stuart | July 16, 1940 |
| 2,395,275 | Jackson | Feb. 19, 1946 |
| 2,433,886 | Bremer | Jan. 6, 1948 |
| 2,442,620 | Simpson | June 1, 1948 |

FOREIGN PATENTS

| Number | Country | Date |
|---|---|---|
| 209,196 | Great Britain | Jan. 7, 1924 |
| 299,904 | Italy | Aug. 22, 1932 |